(12) United States Patent
Xu et al.

(10) Patent No.: US 6,593,933 B1
(45) Date of Patent: Jul. 15, 2003

(54) BLOCK-BASED SYNTHESIS OF TEXTURE IN COMPUTER RENDERED IMAGES

(75) Inventors: Ying-Qing Xu, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/482,285

(22) Filed: Jan. 13, 2000

(51) Int. Cl.[7] .............................................. G06T 11/40
(52) U.S. Cl. ..................................................... 345/586
(58) Field of Search .......................... 345/1.3, 582–587, 345/611, 629, 630, 631, 792, 635; 382/108, 199–205, 206, 268, 269

(56) References Cited

U.S. PATENT DOCUMENTS 5,872,867 A * 2/1999 Bergen ........................ 382/254

OTHER PUBLICATIONS

*Deterministic Chaos*, An Introduction, Heinz Georg Schuster, Second Revised Edition, pp. 200–207.
*Ergodic Problems of Classical Mechanics*, V.I. Arnold, University of Moscow, and A. Avez, University of Paris, W.A. Benjamin, Inc., pp. v–ix, pp. 1–51.
*Multiresolution Sampling Procedure for Analysis and Synthesis of Texture Images*, Jeremy S. DeBonet, Learning & Vision Group, Artificial Intelligence Laboratory, Massachusetts Institute of Technology, SIGGRAPH, 1997, 8 pages.
*Pyramid–Based Texture Analysis/Synthesis*, David J. Heeger, Stanford University, and James R. Bergen, SRI David Sarnoff Research Center, SIGGRAPH, 1995, pp. 1–10.

* cited by examiner

*Primary Examiner*—Jeffery Brier
*Assistant Examiner*—G. F. Cunningham
(74) *Attorney, Agent, or Firm*—Merchant & Gould P. C.

(57) ABSTRACT

A block-based texture synthesis technique synthesizes an image texture that matches the textural appearance of an image texture sample. The synthesis first selects blocks of texture information from the image texture sample and places or pastes the selected blocks in different locations in each tile of the tiled image texture according to a chaos transform. The image texture sample in each tile is the background on which the selected blocks are placed. Each block contains sufficient texture information such that the transformed texture retains the continuity of visual properties, such as shape, size, and color, of the image texture sample. The synthesis can also overlay image texture samples to accomplish the synthesis.

20 Claims, 6 Drawing Sheets

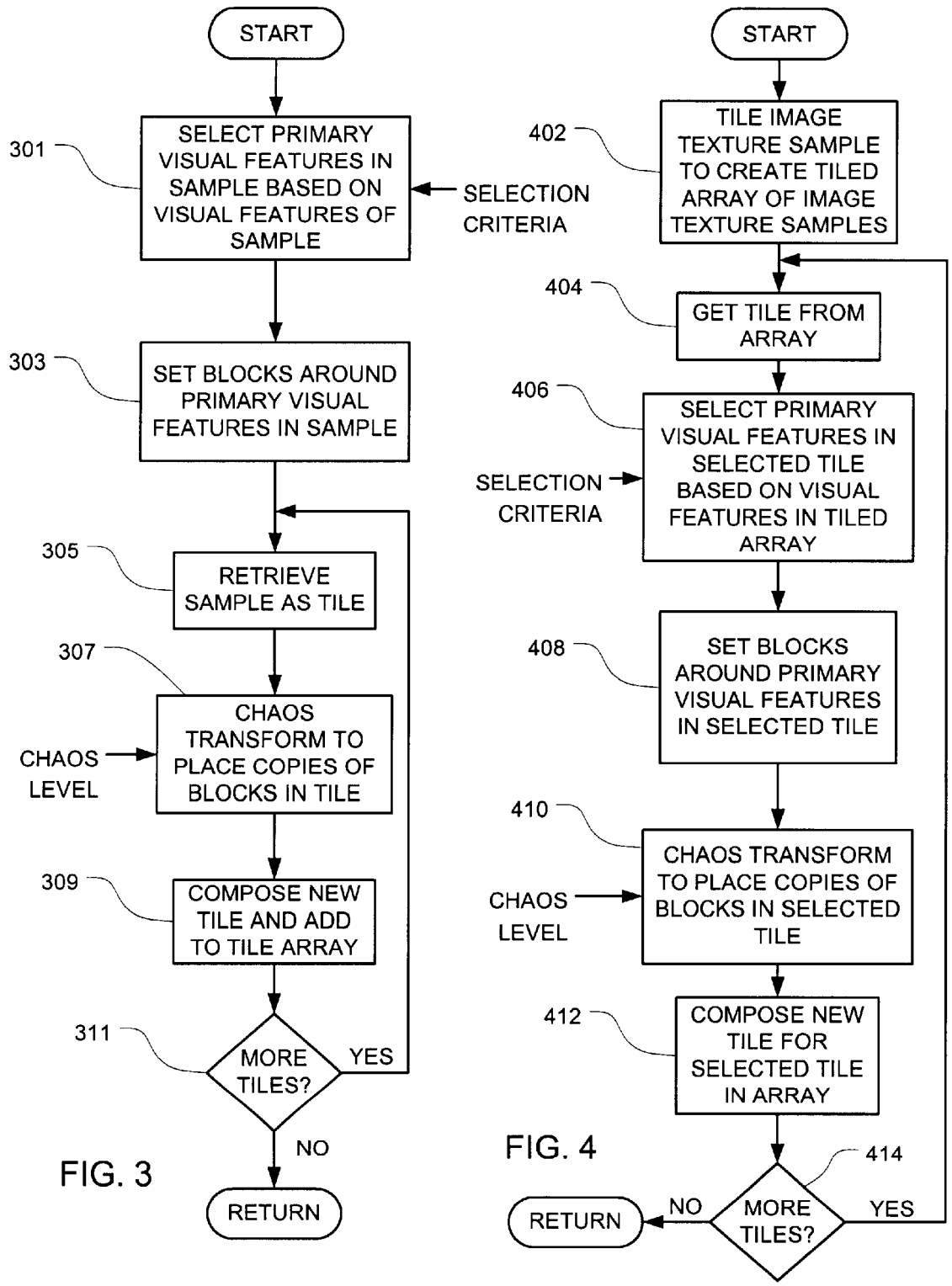

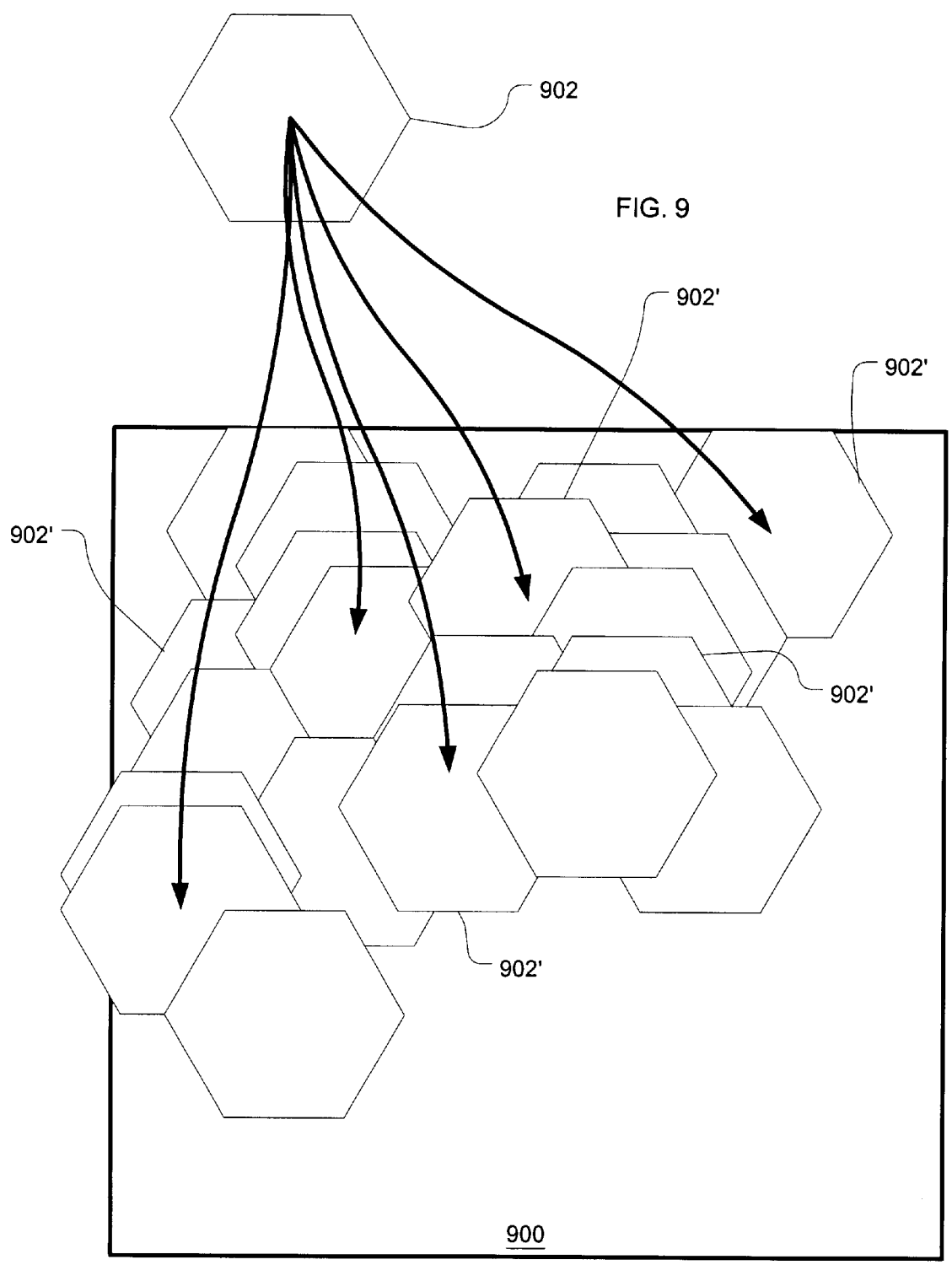

BLOCK-BASED SYNTHESIS OF TEXTURE IN COMPUTER RENDERED IMAGES

FIELD OF THE INVENTION

The invention relates generally to a method of synthesizing image texture in the area of computer graphics. More particularly, the invention provides a block-based texture synthesis method to synthesize surface texture of an image of an object rendered by a computer system.

BACKGROUND OF THE INVENTION

Computer rendered images are more realistic in appearance if the object surface in the image has texture. Important emerging applications, where synthetic texture can make a significant contribution, include website design, artistic design, and texture based design, etc. Most notably, real-time texture synthesizing is particularly in demand for the use in computer-rendering images for animation, games, and virtual reality.

One of the primary goals of synthetic texture generation is to generate a new, larger-sized, and seamless texture, which has visual features similar to an image texture sample. It is well-known that simply tiling or repeating the image texture sample does not achieve this goal because the tiled or repeated texture can lead to unacceptable artifacts such as visible seams between tiles, visible repetition of the image texture sample, or both.

In the past, various techniques have been developed for image texture synthesis, for example, fractal, statistical, reaction-diffusion, Markov, pyramid-based, and hybrid techniques. To date the pyramid-based image texture synthesis has been the most successful in capturing the characteristics of image texture. However, these techniques define the image texture features based on pixels. Accordingly, these techniques work very slowly, and the input sample textures are limited. To be effective, a texture synthesis technique should be efficient enough and fast enough to operate in real-time so that images may be textured on-the-fly as they are rendered.

It is with respect to these and other considerations that the present invention has been made.

SUMMARY OF THE INVENTION

In accordance with this invention, the above and other problems were solved by synthesizing a large image texture from the textural appearance of an image texture sample by randomly overlaying the image texture samples to create a synthesized image texture in a desired image area. In one aspect of the invention the image texture sample is tiled, and image blocks within each tile are randomly overlaid in new positions in the tile to prevent the appearance of artifacts in an array of the tiles. An image texture sample is loaded in an image-based synthesizing system and tiled to create an image texture tile array. Image blocks within each tile of the image texture tile array are randomized to synthesize an image texture similar to the texture of the image texture sample while preventing the creation of artifacts in the image texture. The randomization of image blocks in each tile begins by selecting blocks of pixels in the image texture sample. The selected blocks are placed or pasted over the image texture in new locations in each tile different from the original locations of the blocks in the image texture sample. This new location is calculated by a chaos transformation; the new location is a random location but not a discretionary random location. New location and random location may be used interchangeably herein and should be understood as above. The random placement of blocks to a new location is different for each tile.

The image texture sample is the background texture for each tile, and the selected blocks are foreground texture that overlays and replaces the background texture where the selected blocks are placed. Placing the blocks in random locations in each tile is accomplished, for example, with the "Cat Map" transform based on a chaos model. The Cat Map transform with a chaos model with strongly irregular motion and ergodicity, is described in an article presented by V. I. Arnold and A. Avez, "Ergodic Problems of Classical Mechanics" published by W. A. Benjamin, Inc., New York in 1968. Any discrete randomization transform model may be used.

In another feature of the invention the selection of blocks within the image texture sample is different for each tile. Each block is selected based on image characteristics, or primary visual features, such as shape, size, color, and continuity of the image texture, within the tile or sample and based upon characteristics or features of tiles surrounding the tile. A block may contain any portion of a primary visual feature.

Another feature of the invention is that chaos levels can be selected and configured by a user before transformation. With a pre-selected chaos level, a chaos model transforms a matrix of the selected blocks of image texture by placing or pasting the blocks or samples of image texture in different locations of the tiled image texture to achieve a desired image texture.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

An advantage of the present invention is that the texture that is synthesized by the present invention does not present artifacts either in the form of visible seams, visible repetition of the image texture sample, or both.

Another advantage of the present invention is that it renders an image that has similar textural appearance and structural features as the image texture sample. The rendered image holds the continuity of textel properties, for example, the shape, size, and color, by using the Cat Map transformations to replace the textel location.

A further advantage of the present invention is that the present synthesis method is based on blocks of image texture, not pixels of image texture, thereby significantly increasing the speed of synthesis. Thus, the present invention allows a real time image texture synthesis which is particularly useful for internet-based rendering, animation, electronic games, and virtual reality applications.

These and various other features as well as advantages which characterize the present invention will be apparent from a reading of the following detailed description and a review of the associated drawings.

BRIEF DESCRIPTION OF THE DRAWINGS

FIG. 3 illustrates one embodiment of the present invention where image texture is synthesized based on selecting one set of blocks from an image texture sample and randomly placing the selected blocks in different locations in each tile of an array of tiles of the image texture sample.

FIG. 4 illustrates an embodiment of the present invention where image texture is synthesized based on selecting a set of blocks from each tile of an array of tiles of the image texture sample and randomly placing the selected blocks in a different location in the tile.

FIG. 9 illustrates another embodiment of the invention where image texture samples are randomly overlaid to create the synthesized texture.

DETAILED DESCRIPTION

In the following description of embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
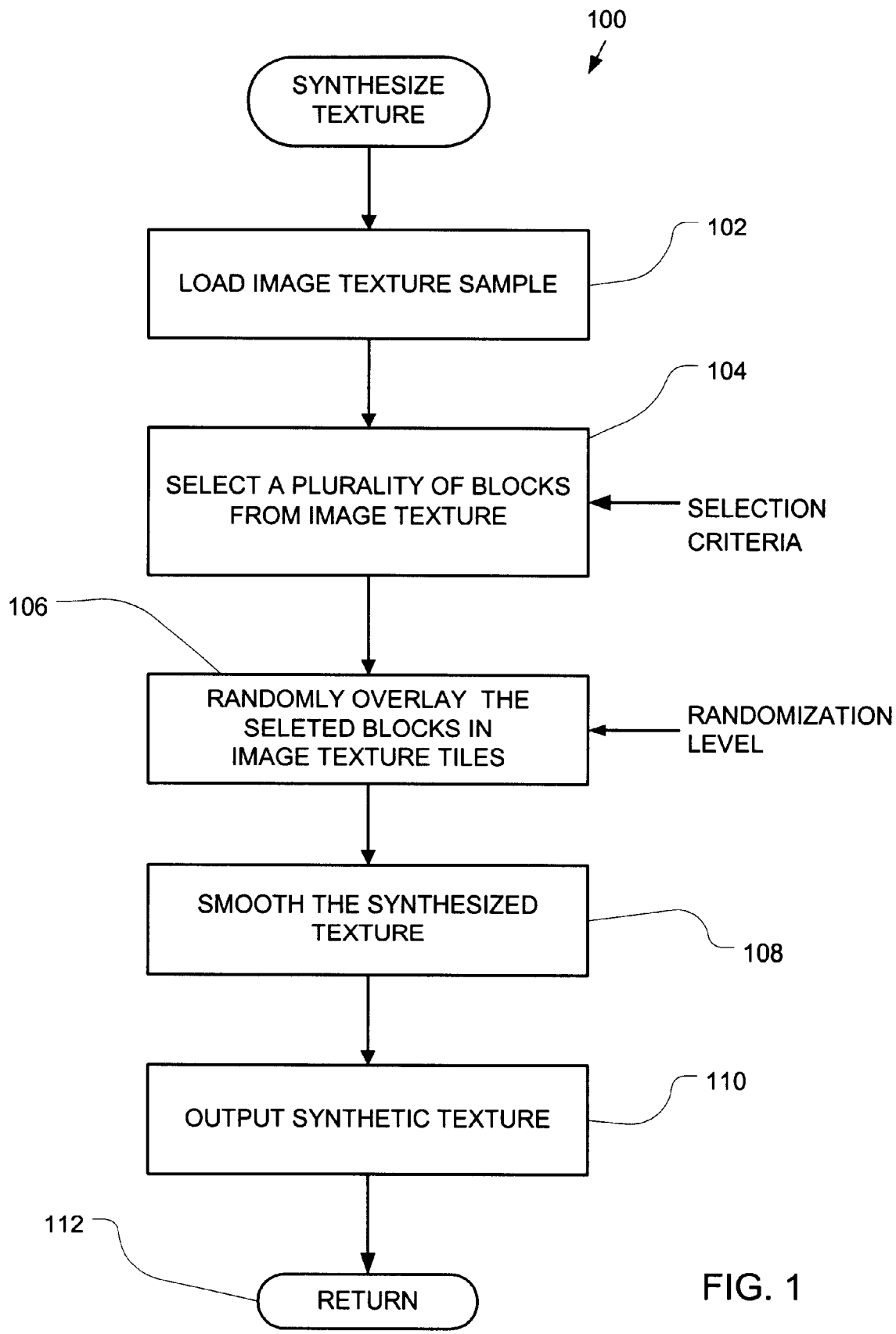
FIG. 1 illustrates a flow of operations to perform image texture synthesis in one embodiment of the present invention.

FIG. 1 illustrates an operational flow 100 executed or performed to synthesize an image texture in accordance with one embodiment of the present invention. The operational flow 100 starts with loading an image texture sample in an operation 102. The loading of an image texture sample can be performed by scanning the sample with a scanner and reading the scanned image file. If the image texture sample has been inputted via other methods, such as being downloaded through the internet, etc., the loading of an image texture sample may be merely reading an image file.

Block selection operation 104 selects a plurality of blocks including portions of the image texture sample based on a selection criteria. The selection criteria include size of block, size of texture features in sample, shape of texture features in sample, color of texture features, and continuity of image texture. These selection criteria are used by the selection operation 104 to select blocks or portions of the image texture sample that contain primary texture features of the image texture sample. The visual contents of the image blocks can be selected according to a common image segmentation algorithm, such as the region growing image segmentation algorithm. The selected blocks may then be used to synthesize a large texture area by overlaying the selected blocks in tiles in an array of tiles copied from the image texture sample.

Overlay operation 106 randomly places the selected blocks in new locations in a tile which is a copy of the image texture sample. Operation 106 copies a selected block from the image texture sample and pastes the selected block over a new location in a tile of the image texture sample. This overlay operation is performed for each tile in the array of image texture sample tiles. The placement of the selected blocks in each tile is randomized so that each tile has a different appearance. Because the blocks are selected to preserve the primary texture features of the image texture sample, the resulting tiled array will appear to be an image texture region much larger than the image texture sample but similar in appearance to the image texture sample and having minimal or no apparent artifacts.

The appearance of artifacts is minimized by increasing the randomization level. In the overlay operation. With a higher randomization level, the selected blocks can be placed in a more divergent manner in each tile. The placement rule can be implemented in a variety of ways. One implementation of the random placement operation is based on a chaos model (Cat Map) with strongly irregular motion and ergodicity, such as described by V. I. Arnold and A. Avez, "Ergodic Problems of Classical Mechanics" published by W. A. BENJAMIN, Inc., New York in 1968.

The randomization level may be predetermined and set at a default level for the overlay operation 106. Alternatively, the randomization level might be specified by a user inputting a randomization value by key entry or by using a mouse to drag a slide on a display. Such a display could also display the image texture sample and the larger image texture when synthesized from the sample according to a selected randomization level.

The selection criteria for selection operation 104 might be predefined or entered by a user. The user might enter values indicating number of selected blocks, size range for blocks, shape of blocks, a predominate color for the image texture feature, a degree of continuity, etc.

After a tile has been synthesized or all the tiles have been synthesized depending on the embodiment of the invention, smoothing operation 108 smoothes block borders and tile borders of the synthesized image texture by averaging image values at the borders. The smoothing operation is optional but is sometimes useful in further minimizing the visual impression of a line through a portion of the synthesized image texture. Once the image texture is synthesized, output operation 110 passes the texture to another operation such as texture mapping (not shown) for use in applying the texture to an object image. Operation control returns to other routines at connector 112.

Figure 2:
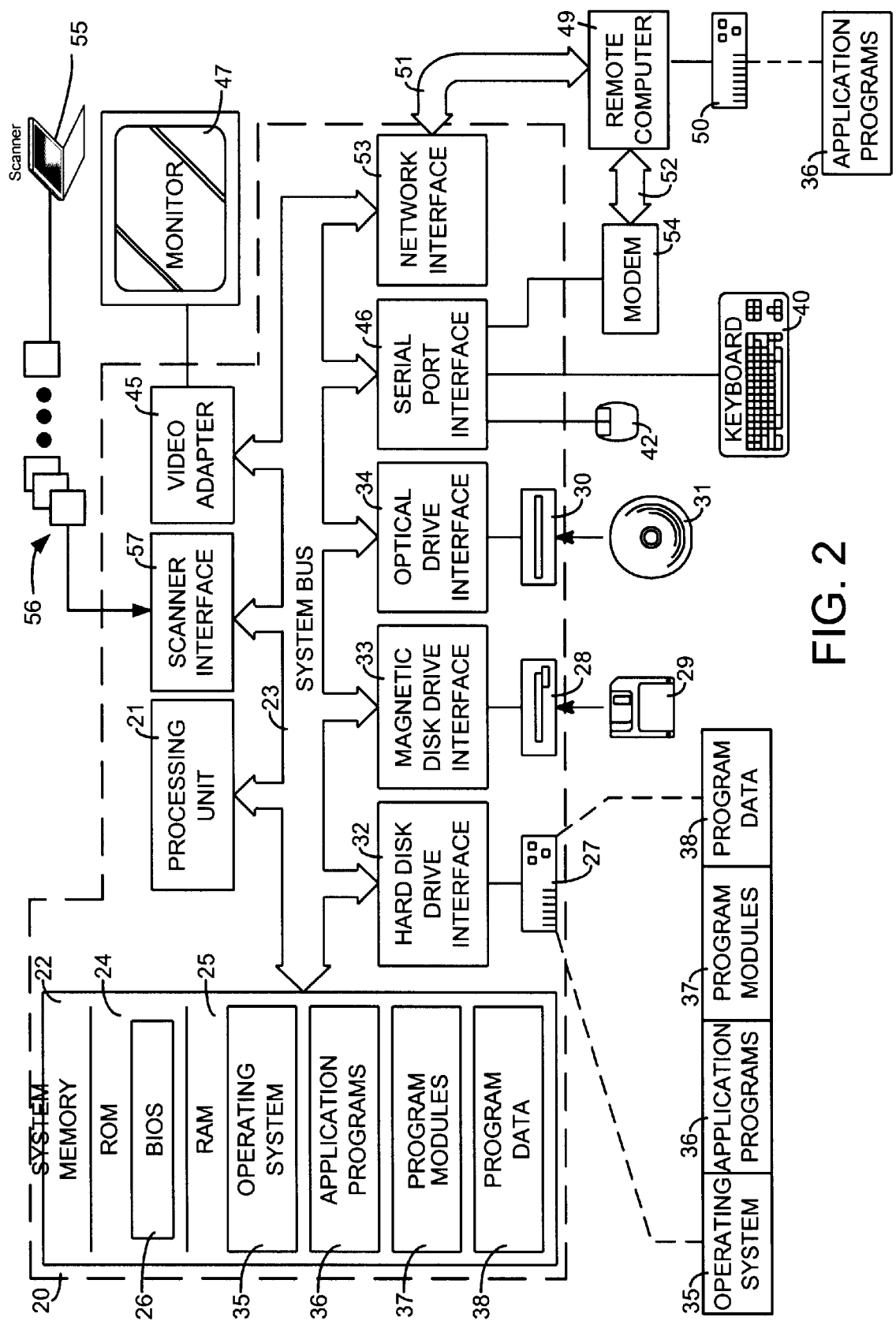
FIG. 2 illustrates one computing environment in which the invention may be implemented.

FIG. 2 illustrates a suitable computing environment in which embodiments of the invention may be implemented. One embodiment of the invention will be described in the general context of computer-executable instructions being executed by a personal computer. Those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. With reference to FIG. 2, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media, The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, multimedia cards, digital video disks, CDs, DVDs, random access memories (RAMs), read only memories (ROMs), and the like, may also be used in the exemplary operating environment.

A user may enter commands and information into the personal computer 20 through input devices such as a keyboard 40 and pointing device 42 (such as a mouse). A scanner 55 capable of capturing one or more image texture sample 56 may also be included as an input device to the personal computer 20. The image texture sample 56 is input into the computer 20 via an appropriate scanner interface 57. The scanner interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the scanner 55. A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. It will be appreciated that the network connections shown are exemplary and other means of establishing a communications link between the computers may be used.

The selection operation 104 and overlay operation 106 described above with reference to FIG. 1 are now shown in more detail in FIG. 3 in one embodiment of the invention. In FIG. 3, the image blocks, or sub regions, around primary features of the image texture sample are selected from the sample or, if the sample is in a tile, from a single tile. The operation flow in FIG. 3 begins at the selection operation 301. Selection operation 301 selects the primary visual features based on the selection criteria as discussed above for operation 104 in FIG. 1. Once the primary visual features are selected, set operation 303 defines blocks or sub-regions containing one or more primary visual features. The block may contain any portion of a plurality of one or more visual features. Since the visual features are irregular in shape it is possible that the block may not contain a visual feature in its entirety.

Figure 5:
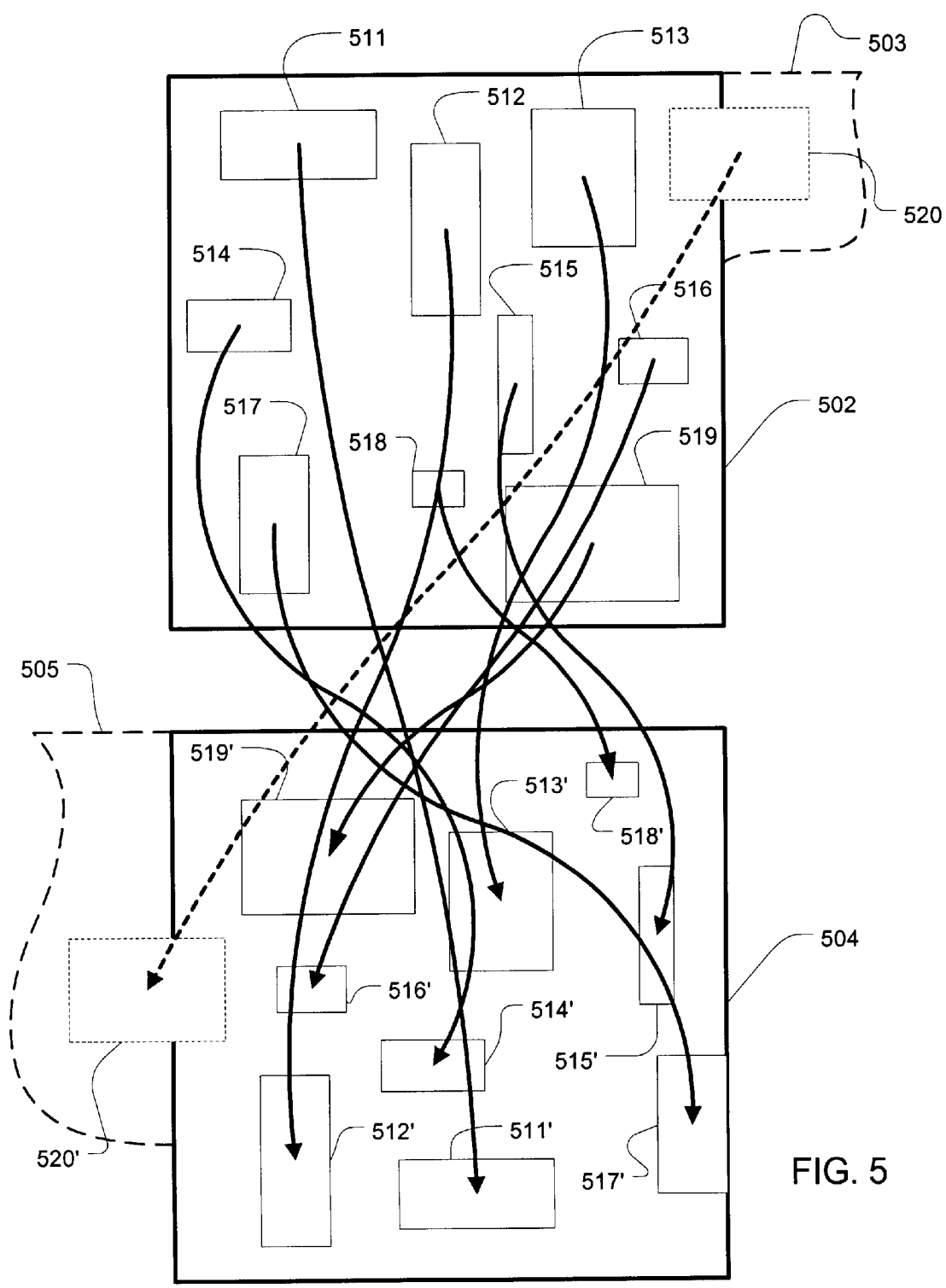
FIG. 5 illustrates random placement of selected blocks to a new tile to compose the new tile.

FIG. 5 shows an image texture sample or tile 502 containing nine blocks. The texture is not shown in sample 502. As explained above, each of the blocks is selected to surround a primary visual feature based upon size, color, shape and continuity of the primary visual feature. The nine blocks 511–519 are shown as rectangular in shape and varying in size to encompass each primary visual feature in a portion of the sample 502. While nine blocks are shown, any number of image blocks might be used depending upon how many primary visual features the user wishes to work with in the sample. Usually, fifteen to twenty blocks or sub regions are sufficient to capture the primary visual features of a sample. Blocks 511–519 are shown as four-sided blocks as that is convenient to define a sub region of the sample. However, the blocks might be circles, hexagons, octagons, trapezoids or any other shape regular or irregular.

After set operation 303 has defined the selected blocks, retrieve operation 305 retrieves the image texture sample and defines it as one tile in an array of tiles which will make of a larger image texture region. Chaos transform operation 307 randomly locates the selected blocks in the tile. The degree of randomization depends upon the chaos level inputted to the transform. Compose operation 309 then pastes the selected blocks over the image texture sample in the tile at the locations defined by the chaos transform operation.

In FIG. 5, tile 504 is the new tile composed by randomly overlaying selected blocks from sample 502 in tile 504. Before the random placement and compose operations, tile 504 will appear identical to tile 502. The selected blocks 511–519 from tile 502 overlay the image texture sample in new tile 504 at new locations depicted by selected blocks 511'–519',. After the placement and compose operations new tile 504 has the appearance of the image texture sample 502, except that blocks 511–519, selected from the sample, overlay the image text background in new tile 504 at the random locations depicted by blocks 511'–519'.

In another embodiment of the invention, a block might be selected that crosses the boundary between two tiles. This is illustrated in dashed lines in FIG. 5 where block 520 crosses the boundary between tile 502 and tile 503. Further, in another embodiment of the invention, random placement of a block might overlay the block across a boundary as depicted in dashed lines in FIG. 5 by block 520' being overlaid on the boundary between new tile 504 and new tile 505. Although block 520 and block 520' both are depicted as overlaying a tile boundary, the random overlaying of a block across a boundary need not be the a source block that also overlays a tile boundary.

When the compose operation 309 is complete for new tile 504, test operation 311 detects whether more tiles are required to build the tile array of image texture tiles. If more tiles are needed the operation flow branches YES and returns to retrieve operation 305. A new tile is then created by chaos transform operation 307 and compose operation 309. The placement of selected blocks in this new tile is again random and different from the placement of selected blocks in other tiles in the array. After all tiles in the tile array have been composed, the operation flow from test operation 311 branches NO, and the operation flow returns to smoothing operation 108 in FIG. 1.

Figure 6:
FIG. 6 illustrates an example of an image texture sample.
Figure 7:
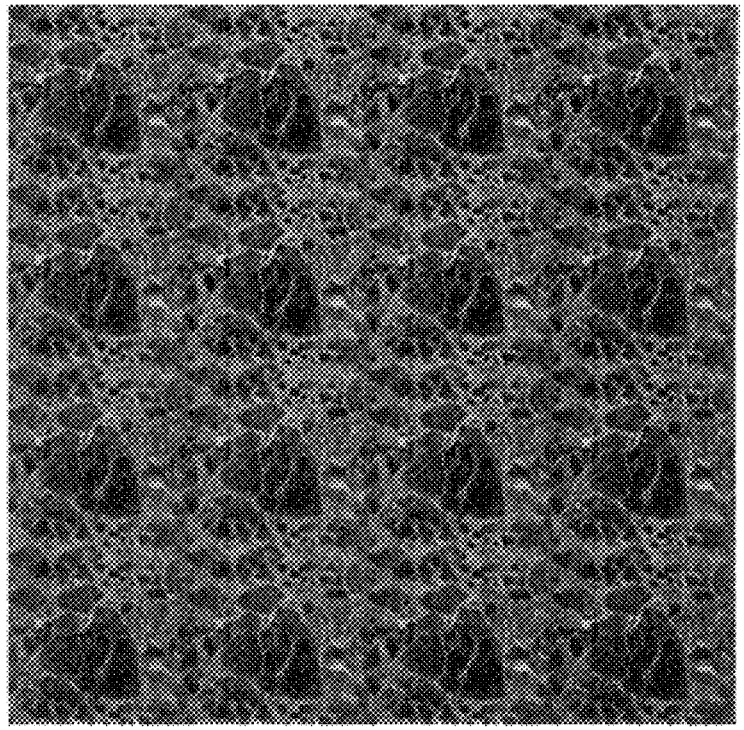
FIG. 7 illustrates an image texture synthesized by tiling the sample of FIG. 7 into an array of tiles of the sample.

In another preferred embodiment of the invention shown in FIG. 4, a tiled array of image texture tiles is first built from identical copies of the image texture sample in each tile. Then each tile in the array is composed as a new tile after selected blocks are randomly overlaid in each image texture tile. Tiling operation 402 begins the operation flow in FIG. 4 by creating the tiled array of identical copies of the image texture sample. FIG. 6 illustrates an example of an image texture sample, and FIG. 7 shows the tiled array (4×4) created by operation 402 with a copy of the texture sample in each image texture tile.

Get operation 404 retrieves an image texture tile, and selection operation 406 selects the primary visual features in the tile retrieved by get operation 404. Selection operation receives input selection criteria in the same manner and operates in the same manner as described above for selection operation 301 in FIG. 3. In an alternative embodiment, selection operation 404 operates differently from operation 301 in that operation 404 also examines tiles surrounding the retrieved tile to select primary visual features in the retrieved tile. The primary visual features selected for the retrieved tile are based on size, color, shape and continuity with visual features in the retrieved tile and in tiles adjacent to the retrieved tile.

Set operation 408 defines selected image blocks of visual data that enclose and include the primary visual features, or portions thereof, selected in operation 406. Set operation 408 operates in the same manner as discussed above for set operation 303 in FIG. 3 with one addition. If blocks crossing tile boundaries are desired as discussed above for block 520 in FIG. 5, then set operation 408 sets the block to cross the tile boundary.

Chaos transform operation 410 receives the selected blocks from set operation 408 and randomly locates copies of the selected blocks in new locations in a new tile as illustrated in and previously described for FIG. 5. In other words, chaos transform operation 410 operates in the same manner as chaos transform operation 307 in FIG. 3 with one addition. If placement of blocks across tile boundaries is desired as discussed above for block 520' in FIG. 5, then transform operation 410 can locate blocks across tile boundaries.

Figure 8:
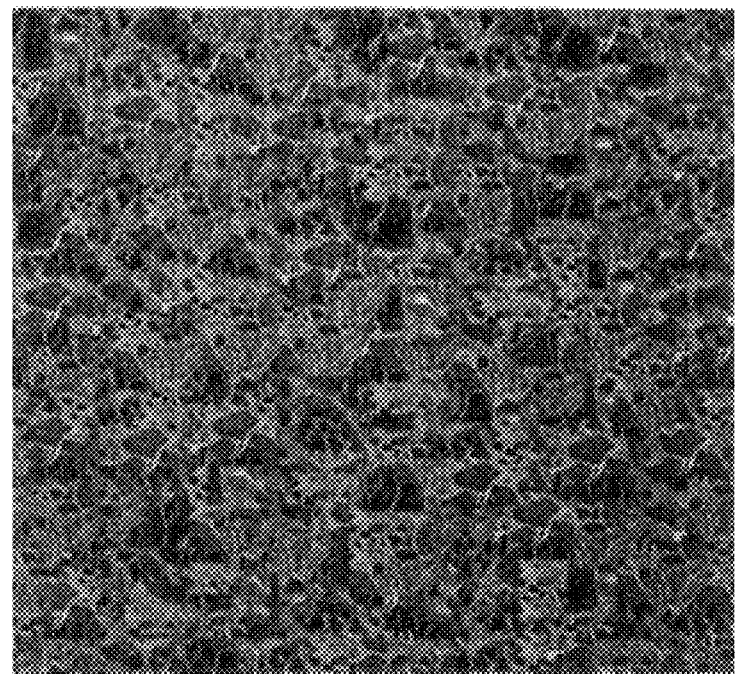
FIG. 8 illustrates an image texture synthesized in accordance with one or more embodiments of the present invention.

Similarly, compose operation 412 operates in the same manner as compose operation 309. Compose operation 412 composes the new tile by pasting the newly located selected blocks for the image texture in the image texture tile to create a new image texture tile. This new image texture tile replaces the original image texture tile retrieved by get operation 404. After the new tile replaces the retrieved tile, query operation 414 asks whether there are more tiles in the tile array to be synthesized. If all of the tiles in the tile array have been composed into new tiles, the operation flow branches NO, and operation flow returns to smoothing step 108 in FIG. 1. After borders of the blocks and the tiles are smoothed, the exemplary tile array in FIG. 7 looks like the image texture synthesized and shown in FIG. 8.

If all the tiles in the array have not been synthesized by the operations 404–412, the operation flow branches YES from query operation 414 and returns to get operation 404. Get operation 404 retrieves another tile from the tile array for processing by operations 406–412. In one embodiment select operation might use the same selected blocks from a previously processed tile in the array. In another embodiment, the select operation would select different blocks in the tile based on the visual features in the retrieved tile and the adjacent tile. In such an embodiment the adjacent tiles could be viewed as original tiles, i.e. the image texture sample, or that might be viewed as a new tile if the adjacent tile has already be resynthesized by operations 404–412. It will be apparent to one skilled in this art, that other variations and combinations of the operations in FIG. 3 and FIG. 4 could be made to create additional embodiments of the invention. One might build the arrays in buffer memory for display or build the array image on the fly and display the synthesized texture directly as it is being created.

FIG. 9 illustrates another embodiment of the invention where the synthesized texture for an area 900 is created by randomly placing copies 902' of the image texture sample 902 in partial overlapping arrangement in an image texture area 900. In this embodiment the image texture sample is hexagonal in shape, but other shapes might be used as suggested above. Further, in this embodiment there is no selection of blocks of primary visual features in the sample. However, the random placement of the image texture sample, so that multiple samples overlay each other, produces a synthesized texture image where only portions of each copy of the image texture sample are displayed. In effect this produces a randomization of the primary visual features, or portions thereof, in the synthesized texture image that fills image texture area 900.

It is to be understood that even though numerous characteristics and advantages of various embodiments of the present invention have been set forth in the foregoing description, together with details of the structure and function of various embodiments of the invention. This disclosure is illustrative only, and changes may be made in detail within the principles of the present invention to the full extent indicated by the broad general meaning of the terms in which the appended claims are expressed.

What is claimed is:

1. A method of synthesizing an image texture from an image texture sample having a plurality of visual features, comprising:

tiling the image texture sample to form an image texture sample array;

selecting a plurality of blocks from the image texture sample array, each selected block including plural pixels of at least one of the plurality of visual features; and randomly overlaying the selected blocks in the image texture sample array to achieve a synthesized image texture.

2. The method of claim 1, wherein the overlaying step comprises:

placing each of the selected blocks at random locations in each tile of the image texture sample array.

3. The method of claim 1, further comprising:

smoothing boundaries of the selected blocks in the synthesized image texture.

4. A system for synthesizing an image texture with a selected chaos level, comprising:

a memory unit storing an image texture sample, the image texture sample having a plurality of image characteristics, each image characteristic comprising plural pixels of the image texture sample; and a processing unit tiling the image texture sample to form a tiled image texture with an array of the image texture samples, the processing unit selecting a plurality of blocks from the image texture sample, each of the blocks including at least one of the plurality of image characteristics, and the processing unit synthesizing the image texture based on the selected chaos level to achieve a synthesized image texture.

5. The system of claim 4, further comprising:

a display unit to display the image texture sample, a selectable chaos level, and the synthesized image texture.

6. A computer program product readable by a computer and encoding instructions for executing a computer process for synthesizing an image texture, said process comprising:

loading an image texture sample, the image texture sample having a plurality of primary visual features;

selecting a plurality of blocks containing visual data of the primary visual features from the image texture sample and thereby generating selected blocks based upon selection criteria for primary visual features in the image texture sample; and randomly placing the selected blocks at random locations in an image texture tile containing as background the image texture sample; and composing the image texture tile by pasting the selected blocks at the random locations to synthesize an image texture tile.

7. The computer program product of claim 6 wherein the computer process further comprises:

repeating all the steps to synthesize a plurality of image texture tiles in a tiled array to synthesize an image texture over a larger image area.

8. The computer program product of claim 7 wherein the computer process further comprises:

smoothing boundaries of the selected blocks in each tile and boundaries of each tile in the synthesized image texture.

9. The computer program product of claim 6 wherein the selecting step of the computer process comprises:

tiling the image texture samples into a tiled array of copies of the image texture sample;

retrieving a tile from the tiled array;

selecting the selected blocks from the tile retrieved from the tile array.

10. The computer program product of claim 9 wherein the computer process further comprises:

after each tile is synthesized by the composing step, detecting whether there are more tiles in the tiled array to be synthesized; and if more tiles are to be synthesized, repeating the retrieving step, the randomly placing step and the composing step to synthesize another tile in the tiled array.

11. The computer program product of claim 9 wherein the computer process further comprises:

after each tile is synthesized by the composing step, detecting whether there are more tiles in the tiled array to be synthesized; and if more tiles are to be synthesized, repeating the retrieving step, the selecting step, the randomly placing step and the composing step to synthesize another tile in the tiled array.

12. A method for synthesizing image texture in images rendered by a computer system, said method comprising:

loading an image texture sample;

selecting based on a selection criteria image blocks from the image texture sample, the image blocks representing primary visual features of the image texture sample;

randomly overlaying the image blocks over the image texture sample in an image texture tile so that the image texture tile is composed of the image texture sample with the image blocks randomly located in the image texture tile replacing portions of the image texture sample covered by the image blocks; and tiling the image texture tiles into a tiled array of synthesized image texture.

13. The method of claim 12 wherein said overlaying step locates the image blocks in an image texture tile based on a randomization level.

14. The method of claim 13 wherein said tiling step comprises creating a tiled array of image texture samples.

15. The method of claim 14 wherein said selecting step comprises:

getting each tile from the tiled array;

feature selecting primary visual features for each tile based on visual features in the tile; and defining image blocks around the primary visual features selected by the feature selecting.

16. The method of claim 15 wherein said randomly overlaying step comprises the steps of:

transforming the location of the image blocks from each tile to random locations in a new tile, the transform based on a chaos model having a chaos level; and composing an image in each new image texture tile by pasting the image blocks over the image texture sample in each new image texture tile.

17. The method of claim 16 wherein the chaos level is selectable by the computing system.

18. A computer program product readable by a computer and encoding instructions for executing a computer process for synthesizing an image texture, said process comprising:

retrieving an image texture sample, the image texture sample having a plurality of primary visual features;

randomly placing copies of the image texture sample in partial overlapping arrangement at random locations in an image texture area; and composing the overlapping arrangement of image texture samples at the random locations to synthesize image texture in the image texture area.

19. The computer program product of claim 18 wherein the computer process further comprises:

smoothing boundaries of the overlapping arrangement of image texture samples in the image texture area.

20. The computer program product of claim 18 wherein said randomly overlaying step comprises:

placing the location of each copy of the image texture sample at random locations in the image texture area using a transform based on a chaos model having a predetermined chaos level.

* * * * *

UNITED STATES PATENT AND TRADEMARK OFFICE
CERTIFICATE OF CORRECTION

PATENT NO.    : 6,593,933 B1                                               Page 1 of 1
DATED         : July 15, 2003
INVENTOR(S)   : Xu et al.

It is certified that error appears in the above-identified patent and that said Letters Patent is hereby corrected as shown below:

Column 5,
Line 10, replace "," with -- . --

Column 6,
Line 51, replace "," with -- . --

Column 7,
Lines 2-13, do not indent these lines.

Signed and Sealed this

Second Day of December, 2003

JAMES E. ROGAN
*Director of the United States Patent and Trademark Office*